United States Patent
Liu et al.

(10) Patent No.: US 11,562,732 B2
(45) Date of Patent: Jan. 24, 2023

(54) METHOD AND APPARATUS FOR PREDICTING MOUTH-SHAPE FEATURE, AND ELECTRONIC DEVICE

(71) Applicant: Baidu Online Network Technology (Beijing) Co., Ltd., Beijing (CN)

(72) Inventors: Yuqiang Liu, Beijing (CN); Tao Sun, Beijing (CN); Wenfu Wang, Beijing (CN); Guanbo Bao, Beijing (CN); Zhe Peng, Beijing (CN); Lei Jia, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 181 days.

(21) Appl. No.: 17/024,662

(22) Filed: Sep. 17, 2020

(65) Prior Publication Data
US 2021/0256962 A1  Aug. 19, 2021

(30) Foreign Application Priority Data
Feb. 13, 2020  (CN) .......................... 202010091799.5

(51) Int. Cl.
*G10L 21/06* (2013.01)
*G10L 21/00* (2013.01)
*G10L 15/16* (2006.01)
*G10L 15/02* (2006.01)
*G10L 15/06* (2013.01)

(52) U.S. Cl.
CPC ............ *G10L 15/02* (2013.01); *G10L 15/063* (2013.01); *G10L 15/16* (2013.01)

(58) Field of Classification Search
CPC ............................. G10L 15/00; G10L 2015/00
See application file for complete search history.

(56) References Cited

U.S. PATENT DOCUMENTS

2018/0253881 A1*  9/2018  Edwards ................. G10L 21/10
2019/0392823 A1   12/2019  Li
(Continued)

FOREIGN PATENT DOCUMENTS

| CN | 106653052 A | 5/2017 |
| CN | 110503942 A | 11/2019 |

(Continued)

OTHER PUBLICATIONS

Liu, Yilong, et al. "Video-audio driven real-time facial animation." ACM Transactions on Graphics (TOG) 34.6 (2015): 1-10. (Year: 2015).*

(Continued)

*Primary Examiner* — Jialong He
(74) *Attorney, Agent, or Firm* — Nixon Peabody LLP

(57) ABSTRACT

A method and apparatus for predicting a mouth-shape feature, and an electronic device are provided. A specific implementation of the method comprises: recognizing a phonetic posterior gram (PPG) of a phonetic feature; and performing a prediction on the PPG by using a neural network model, to predict a mouth-shape feature of the phonetic feature, the neural network model being obtained by training with training samples and an input thereof including a PPG and an output thereof including a mouth-shape feature, and the training samples including a PPG training sample and a mouth-shape feature training sample.

12 Claims, 2 Drawing Sheets

--- recognize a PPG of a phonetic feature — S101 perform a prediction on the PPG by using a neural network model, to predict a mouth-shape feature of the phonetic feature — S102

(56) References Cited

U.S. PATENT DOCUMENTS

2022/0044463 A1\* 2/2022 Kang .................. G06N 3/0445
2022/0108510 A1\* 4/2022 Sagar ..................... G10L 13/00

FOREIGN PATENT DOCUMENTS

| JP | 2007299300 A | 11/2007 |
| JP | 2015038725 A | 2/2015 |
| WO | WO 2019/196306 A1 | 10/2019 |

OTHER PUBLICATIONS

Zhou, Yang, et al. "Visemenet: Audio-driven animator-centric speech animation." ACM Transactions on Graphics (TOG) 37.4 (2018): 1-10. (Year: 2018).\*

Zhao, Guanlong, and Ricardo Gutierrez-Osuna. "Using phonetic posteriorgram based frame pairing for segmental accent conversion." IEEE/ACM Transactions on Audio, Speech, and Language Processing 27.10 (2019): 1649-1660. (Year: 2019).\*

Hazen, Timothy J., Wade Shen, and Christopher White. "Query-by-example spoken term detection using phonetic posteriorgram templates." 2009 IEEE Workshop on Automatic Speech Recognition & Understanding. IEEE, 2009. (Year: 2009).\*

Sun, Lifa, et al. "Phonetic posteriorgrams for many-to-one voice conversion without parallel data training." 2016 IEEE International Conference on Multimedia and Expo (ICME). IEEE, 2016. (Year: 2016).\*

Extended European Search Report in Application No. 21156681.5, dated Jul. 9, 2021 (7 pages).

\* cited by examiner

METHOD AND APPARATUS FOR PREDICTING MOUTH-SHAPE FEATURE, AND ELECTRONIC DEVICE

CROSS-REFERENCE TO RELATED APPLICATIONS

This application claims priority to Chinese Patent Application No. 202010091799.5, filed with the China National Intellectual Property Administration (CNIPA) on Feb. 13, 2020, the contents of which are incorporated herein by reference in their entirety.

TECHNICAL FIELD

The present disclosure relates to the field of virtual technology in the field of computer technology, and particularly to a method and apparatus for predicting a mouth-shape feature, and an electronic device.

BACKGROUND

With the rapid development of artificial intelligence, digital communication and other technologies, virtual image gradually becomes an important development direction of the next generation of artificial intelligence interaction. Here, a mouth-shape feature in the virtual image is a key technical feature. At present, a phoneme, a syllable, etc. are mainly used as phonetic features, and the mouth-shape feature is determined through a series of mouth-shape mapping rules defined by an expert in the field. However, the accuracy of the method of predicting the mouth-shape feature is poor.

SUMMARY

Embodiments of the present disclosure provide a method for predicting a mouth-shape feature, an apparatus and electronic device, for solving the problem of poor accuracy of the method of predicting the mouth-shape feature.

In a first aspect, some embodiments of the present disclosure provide a method for predicting a mouth-shape feature. The method includes:

recognizing a phonetic posterior gram (PPG) of a phonetic feature; and performing a prediction on the PPG by using a neural network model, to predict a mouth-shape feature of the phonetic feature, the neural network model being obtained by training with training samples and an input thereof including a PPG and an output thereof including a mouth-shape feature, and the training samples including a PPG training sample and a mouth-shape feature training sample.

Since the prediction is performed on the PPG of the phonetic feature by the neural network model, the accuracy of the prediction for the mouth-shape feature may be improved, compared with the determination for the mouth-shape feature through a series of mouth-shape mapping rules defined by an expert in the field.

Alternatively, the PPG training sample comprises: PPGs of target phonetic features, the target phonetic features being obtained based on dynamic slicing and having complete semantics; and the mouth-shape feature training sample comprises: mouth-shape features corresponding to the PPGs of the target phonetic features.

Since the target phonetic feature is the phonetic feature obtained based on the dynamic slicing and having the complete semantics, so that the mouth-shape feature predicted by the neural network model more accurate Alternatively, a frequency of a target phonetic feature matches a frequency of a mouth-shape feature corresponding to a PPG of the target phonetic feature.

Since the frequency of the target phonetic feature matches the frequency of the mouth-shape feature, the accuracy of the mouth-shape feature predicted by the neural network model is further improved.

Alternatively, the neural network model is a recurrent neural network (RNN) model having an autoregressive mechanism, and a process of training the RNN model includes:

performing the training by using a mouth-shape feature training sample of a frame preceding a current frame as an input, by using a PPG training sample of the current frame as a condition constraint, and a mouth-shape feature training sample of the current frame as a target.

Since the mouth-shape feature training sample of the preceding frame is used as the input and the PPG training sample of the current frame is used as the condition constraint, the accuracy of the prediction of the above neural network model for the mouth-shape feature is further improved.

Alternatively, the neural network model is a multi-branch neural network model, and the mouth-shape feature of the phonetic feature includes at least two of: a regression mouth-shape point, a mouth-shape thumbnail, a blend shape coefficient, or three dimensional morphable models (3DMM) expression coefficient.

Since a plurality of mouth-shape features may be predicted, the generalization performance of the above neural network model is improved.

Alternatively, the method further includes:

performing predictions on PPGs of pieces of real speech data using the neural network model, to obtain mouth-shape features of the pieces of real speech data; and constructing a mouth-shape feature index library based on the mouth-shape features of the pieces of real speech data, the mouth-shape feature index library being used for synthesizing a mouth shape of a virtual image.

Since the mouth-shape feature index library is constructed using the mouth-shape features predicted by the neural network model, a degree of fitting between the predicted mouth-shape feature outputted by the neural network model and the mouth-shape feature in the index library may be improved, and thus, the precision of the indexing may be improved.

In a second aspect, some embodiments of the present disclosure provide an apparatus for predicting a mouth-shape feature. The apparatus includes:

a recognizing module, configured to recognize a phonetic posterior gram (PPG) of a phonetic feature; and a first predicting module, configured to perform a prediction on the PPG by using a neural network model, to predict a mouth-shape feature of the phonetic feature, the neural network model being obtained by training with training samples and an input thereof including a PPG and an output thereof including a mouth-shape feature, and the training samples including a PPG training sample and a mouth-shape feature training sample.

Alternatively, the PPG training sample comprises: PPGs of target phonetic features, the target phonetic features being obtained based on dynamic slicing and having complete semantics;

the mouth-shape feature training sample comprises: mouth-shape features corresponding to the PPGs of the target phonetic features.

Alternatively, the neural network model is a recurrent neural network (RNN) model having an autoregressive mechanism, and a process of training the RNN model includes:

performing the training by using a mouth-shape feature training sample of a frame preceding a current frame as an input, by using a PPG training sample of the current frame as a condition constraint, and a mouth-shape feature training sample of the current frame as a target.

Alternatively, the neural network model is a multi-branch neural network model, and the mouth-shape feature of the phonetic feature includes at least two of: a regression mouth-shape point, a mouth-shape thumbnail, a blend shape coefficient, or three dimensional morphable models (3DMM) expression coefficient.

Alternatively, the apparatus further includes:

a second predicting module, configured to perform predictions on PPGs of pieces of real speech data using the neural network model, to obtain mouth-shape features of the pieces of real speech data; and a constructing module, configured to construct a mouth-shape feature index library based on the mouth-shape features of the pieces of real speech data, the mouth-shape feature index library being used for synthesizing a mouth shape of a virtual image.

In a third aspect, some embodiments of the present disclosure provide an electronic device, includes:

at least one processor; and a storage device, communicated with the at least one processor, where, the storage device stores an instruction executable by the at least one processor, and the instruction, when executed by the at least one processor, causes the at least one processor to perform any one of the methods of the first aspect.

In a fourth aspect, some embodiments of the present disclosure provide a non-transitory computer readable storage medium, storing a computer instruction, wherein the computer instruction is used to cause a computer to perform any one the methods of the first aspect.

An embodiment of the present disclosure has following advantages and beneficial effect:

By recognizing a phonetic posterior gram (PPG) of a phonetic feature; and performing a prediction on the PPG by using a neural network model, to predict a mouth-shape feature of the phonetic feature, the neural network model being obtained by training with training samples and an input thereof including a PPG and an output thereof including a mouth-shape feature, and the training samples including a PPG training sample and a mouth-shape feature training sample, the technical solution of performing the prediction based on the PPG of a phonetic feature by using a neural network, so that the technical problem of poor accuracy in predicting the mouth-shape feature, realizing the technical effect of improving the accuracy in predicting the mouth-shape feature.

Other effects of the above-mentioned Alternative implementations will be described below in conjunction with specific embodiments.

BRIEF DESCRIPTION OF THE DRAWINGS

Accompanying drawings are used for a better understanding of the scheme, and do not constitute a limitation to the present disclosure. Here.

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

Figure 1:
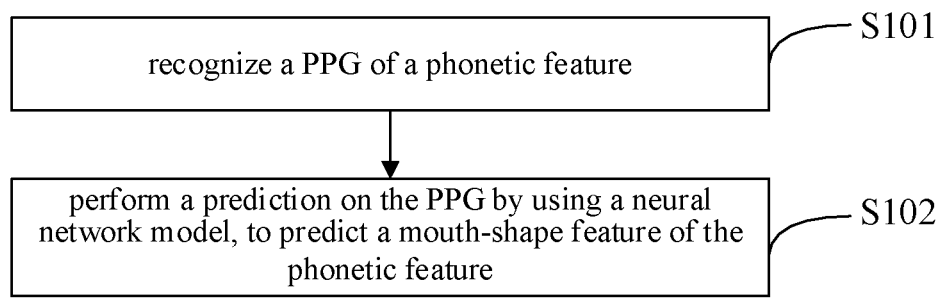
FIG. 1 is a flowchart of a method for predicting a mouth-shape feature provided by an embodiment of the present disclosure.

Referring to FIG. 1, FIG. 1 is a flowchart of a method for predicting a mouth-shape feature provided by an embodiment of the present disclosure. As shown in FIG. 1, the method includes the following steps:

Step S101, recognize a PPG of a phonetic feature.

Here, recognizing a PPG of a phonetic feature may refer to extracting the PPG of the phonetic feature based on an automatic speech recognition system.

It should be noted that the phonetic feature in the present disclosure may also be understood as speech data.

Step S102, perform a prediction on the PPG by using a neural network model, to predict a mouth-shape feature of the phonetic feature, the neural network model being obtained by training with training samples, an input thereof including a PPG and an output thereof including a mouth-shape feature, and a training sample including a PPG training sample and a mouth-shape feature training sample.

Here, the neural network model may be an end-to-end neural network model with the PPG as an input and the corresponding mouth-shape feature as an output.

It should be noted that the type of the neural network model is not limited in the present disclosure, for example, a convolutional neural network (CNN) model, a deep neural network (DNN) model, or an RNN model.

In an embodiment of the present disclosure, since the PPG is a speaker-independent characteristic, a common phonetic feature of different speakers may be obtained through the PPG. Compared with the phonetic feature such as a phoneme, the PPG has a stronger synchronization with speech, that is, the synchronization between the speech and a mouth movement is improved.

In an embodiment of the present disclosure, since the prediction is performed on the PPG of the phonetic feature by the neural network model, the accuracy of the prediction for the mouth-shape feature may be improved, compared with the determination for the mouth-shape feature through a series of mouth-shape mapping rules defined by an expert in the field.

Alternatively, the PPG training sample includes:

PPGs of target phonetic features, a target phonetic feature referring to a phonetic feature obtained based on dynamic slicing and having complete semantics.

The mouth-shape feature training sample includes mouth-shape features corresponding to the PPGs of the target phonetic features.

Here, the phonetic feature obtained based on the dynamic slicing and having the complete semantics may be a phonetic feature having complete semantics which is obtained by slicing according to the semantics of speech.

Since the target phonetic feature is the phonetic feature obtained based on the dynamic slicing and having the complete semantics, an information discontinuity due to that a syllable is truncated manually may be eliminated, so that the mouth-shape feature predicted by the neural network model more accurate.

Alternatively, a frequency of the target phonetic feature matches a frequency of a mouth-shape feature corresponding to the PPG of the target phonetic feature.

Here, the frequency of the target phonetic feature matches the frequency of the mouth-shape feature may refer to that the frequency of the target phonetic feature is the same as or similar to the frequency of the mouth-shape feature. For example, the frequency of the phonetic feature is 25 Hz, and the frequency of the mouth-shape characteristic is 25 Hz, too. Further, when the frequency of the phonetic feature does not match the frequency of the mouth-shape feature, in an embodiment of the present disclosure, the frequency of the phonetic feature may be adjusted, for example, the phonetic feature of 100 Hz is adjusted to be the phonetic feature of 25 Hz. Since the frequency of the phonetic feature may be adjusted, the flexibility of the training of the neural network model may be improved.

Since the frequency of the target phonetic feature matches the frequency of the mouth-shape feature, the accuracy of the mouth-shape feature predicted by the neural network model is further improved.

Alternatively, the neural network model is a recurrent neural network (RNN) model having an autoregressive mechanism, and the process of training the RNN model includes:

performing the training by using a mouth-shape feature training sample of a preceding frame of a current frame as an input, a PPG training sample of the current frame as a condition constraint, and a mouth-shape feature training sample of the current frame as a target.

Here, the above current frame may be a frame currently being used for training in the training process. In an embodiment of the present disclosure, a training sample includes a plurality of frames, and each frame corresponds to one PPG and one mouth-shape feature.

Since the mouth-shape feature training sample of the preceding frame is used as the input and the PPG training sample of the current frame is used as the condition constraint, it may be implemented that the mouth-shape at each moment is related to the speech at the each moment and the speech at the moments before and after the current moment, thus further improving the accuracy of the prediction of the above neural network model for the mouth-shape feature.

Alternatively, the neural network model is a multi-branch neural network model, and the mouth-shape feature of the phonetic feature includes at least two of:

a regression mouth-shape point, a mouth-shape thumbnail, a blend shape coefficient, or three dimensional morphable models (3DMM) expression coefficient.

Here, the multi-branch neural network model may refer to that the neural network model has a plurality of branch networks, and each branch network may predict a mouth-shape feature. For example, four branch networks predict the regression mouth-shape point, the mouth-shape thumbnail, the blend shape coefficient and the 3DMM expression coefficient, respectively.

Since a plurality of mouth-shape features may be predicted, the generalization performance of the above neural network model is improved. Further, since more than one of the regression mouth-shape point, the mouth-shape thumbnail, the blend shape coefficient and the 3DMM expression coefficient may be predicted, so that through the fusion prediction based on the plurality of features, on one hand the generalization performance of the neural network model may be effectively improved using the correlation between the mouth-shape features, and on the other hand, the application range of the model is effectively expanded, and thus, the model may be conveniently applied to the production of 2D and 3D virtual images.

Alternatively, the method further includes:

performing predictions on PPGs of pieces of real speech data using the neural network model, to obtain mouth-shape features of the pieces of real speech data; and constructing a mouth-shape feature index library based on mouth-shape features of the pieces of real speech data, the mouth-shape feature index library being used for synthesis of a mouth shape of a virtual image.

Here, a piece of real speech data and the mouth-shape feature of the piece of real speech data may be a training sample of the neural network model. Obviously, no limitation is made on this. For example, other real data may also be collected.

The constructing a mouth-shape feature index library according to the mouth-shape features of the real speech data may refer to that the mouth-shape feature index library is reconstructed according to the mouth-shape features of the real speech data. For example, the mouth-shape feature index library originally includes a real mouth-shape feature. In this embodiment, the real mouth-shape feature in the mouth-shape feature index library is replaced with the predicted mouth-shape feature of the real speech data.

The mouth-shape feature index library may be an index library from which a mouth-shape feature is acquired in the synthesis of a virtual image.

Since the mouth-shape feature index library is constructed using the mouth-shape features predicted by the neural network model, a degree of fitting between the predicted mouth-shape feature outputted by the neural network model and the mouth-shape feature in the index library may be improved, and thus, the precision of the indexing may be improved.

In embodiments of the present disclosure, by recognizing a phonetic posterior gram (PPG) of a phonetic feature, and performing a prediction on the PPG by using a neural network model, to predict a mouth-shape feature of the phonetic feature, the neural network model being obtained by training with training samples, an input thereof including a PPG and an output thereof including a mouth-shape feature, and a training sample including a PPG training sample and a mouth-shape feature training sample, since the prediction is performed on the PPG of the phonetic feature through the neural network model, the accuracy of the prediction for the mouth-shape feature may be improved, compared with the determination for the mouth-shape feature through the series of mouth-shape mapping rules defined by an expert in the field.

Figure 2:
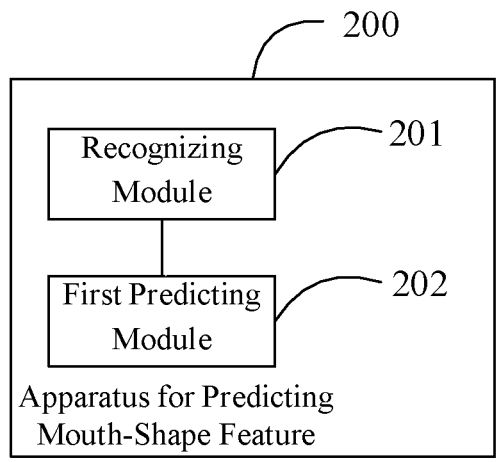
FIG. 2 is a structural diagram of an apparatus for predicting a mouth-shape feature provided by an embodiment of the present disclosure.

Referring to FIG. 2, FIG. 2 is a structural diagram of an apparatus for predicting a mouth-shape feature provided by some embodiments of the present disclosure. As shown in FIG. 2, the apparatus 200 for predicting a mouth-shape feature includes:

a recognizing module 201, configured to recognize a phonetic posterior gram (PPG) of a phonetic feature; and a first predicting module 202, configured to perform a prediction on the PPG by using a neural network model, to predict a mouth-shape feature of the phonetic feature, the neural network model being obtained by training with training samples and an input thereof including a PPG and an output thereof including a mouth-shape feature, and the training samples including a PPG training sample and a mouth-shape feature training sample.

Alternatively, the PPG training sample includes:

PPGs of target phonetic features, the target phonetic features being obtained based on dynamic slicing and having complete semantics.

The mouth-shape feature training sample includes mouth-shape features corresponding to the PPGs of the target phonetic features.

Alternatively, the neural network model is a recurrent neural network (RNN) model having an autoregressive mechanism, and a process of training the RNN model includes:

performing the training by using a mouth-shape feature training sample of a frame preceding a current frame as an input, by using a PPG training sample of the current frame as a condition constraint, and a mouth-shape feature training sample of the current frame as a target.

Alternatively, the neural network model is a multi-branch neural network model, and the mouth-shape feature of the phonetic feature includes at least two of:

a regression mouth-shape point, a mouth-shape thumbnail, a blend shape coefficient, or a three dimensional morphable models (3DMM) expression coefficient.

Figure 3:
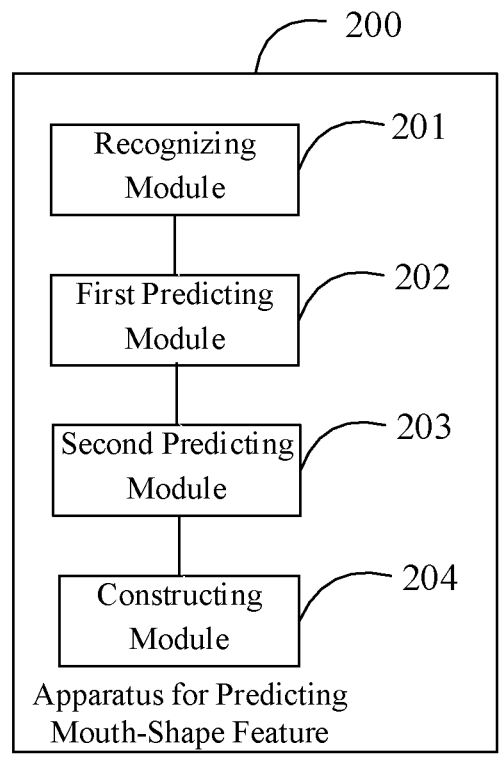
FIG. 3 is a structural diagram of an apparatus for predicting a mouth-shape feature provided by another embodiment of the present disclosure.

Alternatively, as shown in FIG. 3, the apparatus further includes:

a second predicting module 203, configured to perform predictions on PPGs of pieces of real speech data using the neural network model, to obtain mouth-shape features of the pieces of real speech data; and a constructing module 204, configured to construct a mouth-shape feature index library based on the mouth-shape features of the pieces of real speech data, the mouth-shape feature index library being used for synthesizing a mouth shape of a virtual image.

The apparatus provided in this embodiment can implement the processes implemented in the embodiments of the method shown in FIG. 1, and may achieve the same beneficial effects. To avoid repetition, details will not be repeatedly described here.

According to some embodiments of the present disclosure, an electronic device and a readable storage medium are provided.

Figure 4:
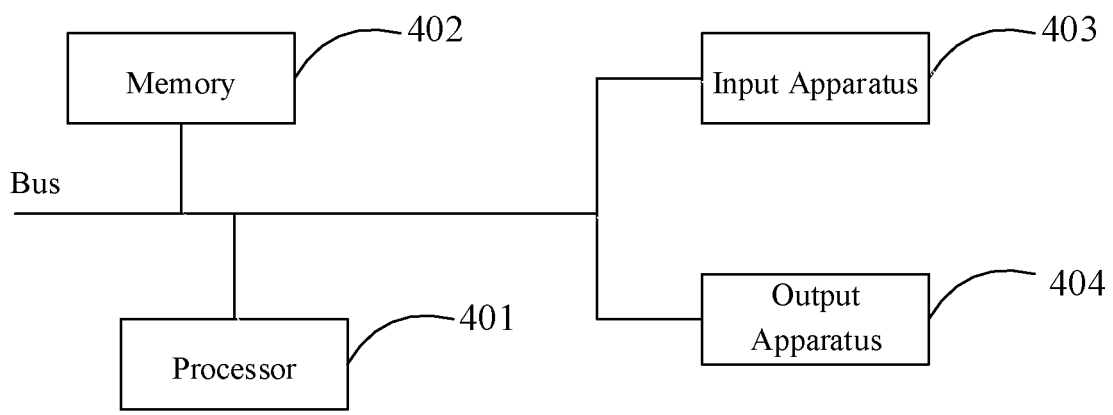
FIG. 4 is a block diagram of an electronic device adapted to implement a method for predicting a mouth-shape feature according to embodiments of the present disclosure.

As shown in FIG. 4, FIG. 4 is a block diagram of an electronic device of a method for predicting a mouth-shape feature according to embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 4, the server includes one or more processors 401, a memory 402, and an interface for connecting components, including high-speed interfaces and low-speed interfaces. The various components are connected to each other using different buses, and may be installed on a common motherboard or in other methods as required. The processor may process instructions executed within the server, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 4, one processor 401 is used as an example.

The memory 402 is a non-transitory computer readable storage medium provided in some embodiments of the present disclosure. The memory stores instructions executable by at least one processor, so that the at least one processor performs the method for predicting a mouth-shape feature provided by some embodiments of the present disclosure. The non-transitory computer readable storage medium of the present disclosure stores computer instructions for causing a computer to perform the method for predicting a mouth-shape feature provided by some embodiments of the present disclosure.

As a non-transitory computer readable storage medium, the memory 402 may be used to store non-transitory software programs, non-transitory computer executable programs and modules, for example, the program instructions/modules corresponding to the method for predicting a mouth-shape feature in embodiments of the present disclosure (for example, the recognizing module 201 and the first predicting module 201 shown in FIG. 2). The processor 401 runs the non-transitory software programs, instructions, and modules stored in the memory 402 to execute various functional applications and data processing of the server, that is, to implement the method for predicting a mouth-shape feature of the above method embodiments.

The storage device 402 may include a storage program area and a storage data area. Here, the storage program area may store an operating system and an application program required for at least one function. The storage data area may store data, etc. created according to the use of the electronic device of the method for predicting a mouth-shape characteristic. In addition, the storage device 402 may include a high speed random access memory, and may also include a non-transitory storage device, for example, at least one magnetic disk storage device, a flash storage device, or other non-transitory solid state storage devices. In some embodiments, the storage device 402 may alternatively include a storage device disposed remotely relative to the processor 401. The remote storage device may be connected to the electronic device of the method for predicting a mouth-shape characteristic via a network. Examples of such network include, but not limited to, the Internet, an enterprise intranet, a local area network, a mobile communication network, and a combination thereof.

The electronic device of the method for predicting a mouth-shape characteristic may further include: an input apparatus 403 and an output apparatus 404. The processor 401, the storage device 402, the input apparatus 403 and the output apparatus 404 may be connected via a bus or in other ways. In FIG. 4, the connection via a bus is taken as an example.

The input apparatus 403 may receive an inputted number or inputted character information, and generate a key signal input related to the user setting and functional control of the electronic device of the method for predicting a mouth-shape characteristic. For example, the input apparatus is a touch screen, a keypad, a mouse, a track pad, a touch pad, a pointing stick, one or more mouse buttons, a track ball, a joystick, or the like. The output apparatus 404 may include a display device, an auxiliary lighting apparatus (e.g., an LED), a tactile feedback apparatus (e.g., a vibration motor), etc. The display device may include, but not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated application specific integrated circuits (ASIC), computer hardware, firmware, software, and/or combinations thereof. These various embodiments may include: being implemented in one or more computer programs that may be executed and/or interpreted on a programmable system that includes at least one programmable processor. The programmable processor may be a dedicated or general purpose programmable processor, and may receive data and instructions from a memory system, at least one input apparatus, and at least one output apparatus, and transmit the data and instructions to the storage system, the at least one input apparatus, and the at least one output apparatus.

These computing programs, also referred to as programs, software, software disclosures, or codes, include machine instructions of a programmable processor, and may be implemented using high-level procedures and/or object-oriented programming languages, and/or assembly/machine languages. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

To provide an interaction with a user, the systems and techniques described here may be implemented on a computer having a display apparatus (e.g., a CRT (cathode ray tube) or an LCD (liquid crystal display) monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including an acoustic input, a speech input, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and the Internet.

The computer system may include a client and a server. The client and server are generally far from each other and usually interact through a communication network. The relationship between the client and the server is generated by computer programs that run on the corresponding computer and having a client-server relationship with each other.

According to the technical solution of embodiments of the present disclosure, a phonetic posterior gram (PPG) of a phonetic feature is recognized, and a prediction is performed on the PPG by using a neural network model, to predict a mouth-shape feature of the phonetic feature, the neural network model being obtained by training with training samples and an input thereof including a PPG and an output thereof including a mouth-shape feature, and the training samples including a PPG training sample and a mouth-shape feature training sample. Since the prediction is performed on the PPG of the phonetic feature through the neural network model, the accuracy of the prediction for the mouth-shape feature may be improved, compared with the determination for a mouth-shape feature through a series of mouth-shape mapping rules defined by an expert in the field.

It should be understood that the various forms of processes shown above may be used to reorder, add, or delete steps. For example, the steps described in embodiments of the present disclosure may be performed in parallel, sequentially, or in different orders. As long as the desired results of the technical solution disclosed in embodiments of the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for predicting a mouth-shape feature, comprising:
    recognizing a phonetic posterior gram (PPG) of a phonetic feature of a speech; and
    performing a prediction on the PPG by using a neural network model, to predict a mouth-shape feature of the phonetic feature, the neural network model being obtained by training with training samples and an input thereof including a PPG and an output thereof including a mouth-shape feature, and the training samples including a PPG training sample and a mouth-shape feature training sample,
    wherein the PPG training sample comprises:
    PPGs of target phonetic features, a target phonetic feature being a phonetic feature having complete semantics which is obtained by slicing according to the semantics of the speech; and the mouth-shape feature training sample comprises:
mouth-shape features corresponding to the PPGs of the target phonetic features,
wherein the neural network model is a multi-branch neural network model, and the mouth-shape feature of the phonetic feature includes at least two of:
a regression mouth-shape point, a mouth-shape thumbnail, a blend shape coefficient, or three-dimensional morphable models (3DMM) expression coefficient,
wherein the multi-branch neural network model has a plurality of branch networks, and each branch network predicts a mouth-shape feature of the regression mouth-shape point, the mouth-shape thumbnail, the blend shape coefficient, and the 3DMM expression coefficient.

2. The method according to claim 1, wherein a frequency of a target phonetic feature matches a frequency of a mouth-shape feature corresponding to a PPG of the target phonetic feature.

3. The method according to claim 1, wherein the multi-branch neural network model is a recurrent neural network (RNN) model having an autoregressive mechanism, and a process of training the RNN model includes:
performing the training by using a mouth-shape feature training sample of a frame preceding a current frame as an input, by using a PPG training sample of the current frame as a condition constraint, and a mouth-shape feature training sample of the current frame as a target.

4. The method according to claim 1, further comprising:
performing predictions on PPGs of pieces of pieces of real speech data using the neural network model, to obtain mouth-shape features of the pieces of real speech data; and
constructing a mouth-shape feature index library based on the mouth-shape features of the pieces of real speech data, the mouth-shape feature index library being used for synthesizing a mouth shape of a virtual image.

5. An electronic device, comprising:
at least one processor; and
a memory, communicated with the at least one processor, wherein the memory stores an instruction executable by the at least one processor, and the instruction, when executed by the at least one processor, causes the at least one processor to perform operations, the operations comprise:
recognizing a phonetic posterior gram (PPG) of a phonetic feature of a speech; and
performing a prediction on the PPG by using a neural network model, to predict a mouth-shape feature of the phonetic feature, the neural network model being obtained by training with training samples and an input thereof including a PPG and an output thereof including a mouth-shape feature, and the training samples including a PPG training sample and a mouth-shape feature training sample,
wherein the PPG training sample comprises:
PPGs of target phonetic features, a target phonetic feature being a phonetic feature having complete semantics which is obtained by slicing according to the semantics of the speech; and
the mouth-shape feature training sample comprises:
mouth-shape features corresponding to the PPGs of the target phonetic features,
wherein the neural network model is a multi-branch neural network model, and the mouth-shape feature of the phonetic feature includes at least two of:
a regression mouth-shape point, a mouth-shape thumbnail, a blend shape coefficient, or three-dimensional morphable models (3DMM) expression coefficient,
wherein the multi-branch neural network model has a plurality of branch networks, and each branch network predicts a mouth-shape feature of the regression mouth-shape point, the mouth-shape thumbnail, the blend shape coefficient, and the 3DMM expression coefficient.

6. The electronic device according to claim 5, wherein a frequency of a target phonetic feature matches a frequency of a mouth-shape feature corresponding to a PPG of the target phonetic feature.

7. The electronic device according to claim 5, wherein the multi-branch neural network model is a recurrent neural network (RNN) model having an autoregressive mechanism, and a process of training the RNN model includes:
performing the training by using a mouth-shape feature training sample of a frame preceding a current frame as an input, by using a PPG training sample of the current frame as a condition constraint, and a mouth-shape feature training sample of the current frame as a target.

8. The electronic device according to claim 5, wherein the operations further comprise:
performing predictions on PPGs of pieces of real speech data using the neural network model, to obtain mouth-shape features of the pieces of real speech data; and
constructing a mouth-shape feature index library based on the mouth-shape features of the pieces of real speech data, the mouth-shape feature index library being used for synthesizing a mouth shape of a virtual image.

9. A non-transitory computer readable storage medium, storing a computer instruction, wherein the computer instruction, when executed by a processor, causes the processor to perform operations, the operations comprise:
recognizing a phonetic posterior gram (PPG) of a phonetic feature of a speech; and
performing a prediction on the PPG by using a neural network model, to predict a mouth-shape feature of the phonetic feature, the neural network model being obtained by training with training samples and an input thereof including a PPG and an output thereof including a mouth-shape feature, and the training samples including a PPG training sample and a mouth-shape feature training sample,
wherein the PPG training sample comprises:
PPGs of target phonetic features, a target phonetic feature being a phonetic feature having complete semantics which is obtained by slicing according to the semantics of the speech; and
the mouth-shape feature training sample comprises:
mouth-shape features corresponding to the PPGs of the target phonetic features,
wherein the neural network model is a multi-branch neural network model, and the mouth-shape feature of the phonetic feature includes at least two of:
a regression mouth-shape point, a mouth-shape thumbnail, a blend shape coefficient, or three-dimensional morphable models (3DMM) expression coefficient,
wherein the multi-branch neural network model has a plurality of branch networks, and each branch network predicts a mouth-shape feature of the regression mouth-shape point, the mouth-shape thumbnail, the blend shape coefficient, and the 3DMM expression coefficient.

10. The medium according to claim 9, wherein a frequency of a target phonetic feature matches a frequency of a mouth-shape feature corresponding to a PPG of the target phonetic feature.

11. The medium according to claim 9, wherein the multi-branch neural network model is a recurrent neural network (RNN) model having an autoregressive mechanism, and a process of training the RNN model includes:

performing the training by using a mouth-shape feature training sample of a frame preceding a current frame as an input, by using a PPG training sample of the current frame as a condition constraint, and a mouth-shape feature training sample of the current frame as a target.

12. The medium according to claim 9, wherein the operations further comprise:

performing predictions on PPGs of pieces of pieces of real speech data using the neural network model, to obtain mouth-shape features of the pieces of real speech data; and constructing a mouth-shape feature index library based on the mouth-shape features of the pieces of real speech data, the mouth-shape feature index library being used for synthesizing a mouth shape of a virtual image.

\* \* \* \* \*